(12) United States Patent
Jang

(10) Patent No.: US 12,171,639 B2
(45) Date of Patent: Dec. 24, 2024

(54) IMPLANT ABUTMENT CAPABLE OF STABLY ADJUSTING VERTICAL DIMENSION OF OCCLUSION

(71) Applicant: Cheon Seok Jang, Ansan-si (KR)

(72) Inventor: Cheon Seok Jang, Ansan-si (KR)

( * ) Notice: Subject to any disclaimer, the term of this patent is extended or adjusted under 35 U.S.C. 154(b) by 344 days.

(21) Appl. No.: 17/767,078

(22) PCT Filed: Dec. 1, 2020

(86) PCT No.: PCT/KR2020/017370
§ 371 (c)(1),
(2) Date: Apr. 7, 2022

(87) PCT Pub. No.: WO2021/118146
PCT Pub. Date: Jun. 17, 2021

(65) Prior Publication Data
US 2022/0361988 A1    Nov. 17, 2022

(30) Foreign Application Priority Data
Dec. 10, 2019   (KR) .......... 10-2019-0164054

(51) Int. Cl.
*A61C 8/00*    (2006.01)
(52) U.S. Cl.
CPC .......... *A61C 8/0048* (2013.01); *A61C 8/0059* (2013.01); *A61C 8/0069* (2013.01); *A61C 8/0068* (2013.01)
(58) Field of Classification Search
CPC ....... A61C 8/005; A61C 8/0059; A61C 8/006; A61C 8/0062; A61C 8/0063; A61C 8/0066; A61C 8/0068; A61C 8/0069
See application file for complete search history.

(56) References Cited

U.S. PATENT DOCUMENTS

2005/0019730 A1* 1/2005 Gittleman .............. A61C 8/005
  433/174
2005/0136379 A1* 6/2005 Niznick ............... A61C 8/0001
  433/173

(Continued)

FOREIGN PATENT DOCUMENTS

KR  10-2001-0080899 A   8/2001
KR  10-2005-0078806 A   8/2005
(Continued)

*Primary Examiner* — Jacqueline T Johanas
*Assistant Examiner* — Jennifer P Connell
(74) *Attorney, Agent, or Firm* — KORUS Patent, LLC; Seong Il Jeong (57) ABSTRACT

An implant abutment capable of stably adjusting vertical dimension of occlusion, the implant abutment comprising: an upper coupling portion that is an upper portion coupled to an artificial tooth; a lower coupling portion that is a lower portion coupled to a fixture; an exposed portion that is a portion exposed to the outside between the upper coupling portion and the lower coupling portion, and an adjustment groove that is formed on an outer circumferential surface of the upper coupling portion and inwardly recessed in the upper coupling portion. According to the implant abutment capable of stably adjusting vertical dimension of occlusion of the present invention, although the abutment has a low upper coupling portion, it can maintain stable coupling with the artificial tooth, thereby ultimately ensuring ease of adjusting a height of the abutment.

8 Claims, 6 Drawing Sheets

(56) References Cited

U.S. PATENT DOCUMENTS

| | | | |
|---|---|---|---|
| 2008/0241789 A1 | 10/2008 | Muncorf | |
| 2012/0202173 A1* | 8/2012 | Seo | A61C 8/0081 |
| | | | 433/220 |
| 2017/0258558 A1* | 9/2017 | Morgan | A61C 8/0048 |

FOREIGN PATENT DOCUMENTS

| | | | | |
|---|---|---|---|---|
| KR | 20-0433571 Y1 | | 12/2006 | |
| KR | 10-0842318 B1 | | 7/2008 | |
| KR | 20130014735 A | * | 2/2013 | ........... A61C 8/0074 |
| KR | 101459909 B1 | * | 11/2014 | ................ A61C 8/00 |
| KR | 10-1577746 B1 | | 12/2015 | |
| KR | 10-2099062 B1 | | 4/2020 | |
| WO | WO-0006042 A1 | * | 2/2000 | ........... A61C 8/0012 |

\* cited by examiner

IMPLANT ABUTMENT CAPABLE OF STABLY ADJUSTING VERTICAL DIMENSION OF OCCLUSION

FIELD OF THE INVENTION

The present invention relates to an implant abutment capable of stably adjusting vertical dimension of occlusion, and more particularly, to an implant abutment capable of stably maintaining a coupling force with an artificial tooth and enhancing the overall appearance of an implant by lowering a height of the abutment.

BACKGROUND OF THE INVENTION

A dental implant surgery is a treatment method in which an implant made of a material that is harmless to the human body or that can perform similar functions to natural teeth is inserted in a lost tooth caused by a cavity or gum disease or in an area that does not have a bone or gum due to an accident or a tumor to recover the functions similar to natural teeth and aesthetic appearance.

An implant that is generally used in dentistry may be composed of an artificial tooth, an abutment, and a fixture. The artificial teeth are teeth made artificially to replace natural teeth, the fixture is a portion that is inserted and fixed into the gum bone, and the abutment is a portion that connects the artificial tooth and the fixture.

The implant may be implemented in various dimensions according to the vertical dimension of occlusion. The vertical dimension of occlusion refers to the vertical distance from the gum to the occlusal surface of the opposing teeth in a state in which the teeth are engaged, and generally has a dimension of about 6 to 9 mm.

Typically, the dimension of the portion where the abutment of the implant is inserted into the artificial tooth is about 4 to 7 mm. If the vertical dimension of occlusion is 6 mm, an abutment with a portion inserted into the artificial tooth of about 4 mm is selected, and if the vertical dimension of occlusion is 7 mm, an abutment with a portion inserted into the artificial tooth of about 5 mm is selected. Here, if the margin of about 2 mm is not formed, it may increase a possibility of fracture of the artificial tooth. Therefore, in general, the occlusal surface is created with a dimensional margin of about 2 mm to prevent fracture of the artificial tooth.

When the vertical dimension of occlusion is large, the length of the artificial tooth becomes longer, and accordingly, the length of the abutment inserted into the artificial tooth also becomes longer. On the other hand, when the vertical dimension of occlusion is small, as the length of the artificial tooth is shortened, the length of the abutment inserted into the artificial tooth is also shortened. In this case, when the length of the abutment is shortened, the coupling force between the artificial tooth and the abutment may be weakened. In other words, when an external force is applied to the artificial tooth, the artificial tooth and the abutment may be separated. If the vertical dimension of occlusion is smaller than 6 mm, it is impossible to form a dimensional margin of about 2 mm.

In order to solve this problem, the conventional implant uses a ucla abutment having a structure different from the abutment having the above-described general structure in a region with a short vertical dimension of occlusion. The ucla abutment is an abutment that the length is fixed and is used in a way that the artificial tooth is sculpted using wax on the top of the abutment and then the size and length are trimmed to fit the vertical dimension of occlusion. Since the artificial tooth and the abutment are integrally combined with this ucla abutment, the artificial tooth and the abutment are not easily separated by external force even in a region with a short vertical dimension of occlusion. However, the ucla abutment has problems in that the installation procedure is complicated, and many patients are reluctant to receive the implant treatment using this abutment for an aesthetic appearance issue due to a hole formed on the upper surface of the artificial tooth into which a screw for coupling the abutment and the fixture is to be inserted.

In addition, according to Korean Patent No. 10-1577746, 'A screwless installation type implant in a fixture installation hole of alveolar bone and a treatment method using the same,' a hole for fixture search is drilled in order to implant an artificial tooth in the alveolar bone, and arc shaped locking grooves are formed on both sides of the lower surface of the fixture installation hole. Fixtures consist of a pair of separate fixtures that are to be installed in the fixture installation hole. Each fixture has a column shape with a ¼ arc shape in a cross section and includes a thread formed only on the inner surface and a crescent locking plate formed on the lower portion. At this time, the arc-shaped locking groove is configured to be inserted into the crescent locking plate. Accordingly, when installing the fixture for coupling artificial tooth, even if a separate fixture coupling tap is not formed in the fixture installation hole, the crescent-shaped locking plate of a pair of separate fixtures inserted opposite to each other is caught in the arc-shaped locking groove. In addition, according to the above technology, an integrated fixture in which the lower portions of columns, each of which has a thread formed on the inner surface and a ¼ arc shape in a cross section, are integrally connected through a disk can be inserted between a pair of separate fixtures. The implant surgery can be completed in such a way that a pair of separate fixtures and integral fixtures forming a single cylindrical shape is implanted by combining the screw thread formed on the inner surface of the mutual coupling structure of the pair of separate fixtures and the integral fixtures and the screw integrally fixed with the artificial tooth.

This technology can prevent the risk of the artificial teeth and the screw being separated by inserting the integrally fixed structure of the artificial tooth and the screw into the interior of the fixture. However, when an external force is exerted to the artificial tooth in a portion with a short vertical dimension of occlusion, another problem may occur in that the artificial tooth may be fractured in the screw due to shaking of the artificial tooth.

Therefore, there is an urgent need to develop a new and advanced implant that enables an artificial tooth and an abutment to be firmly combined without being separated by an external force even in a portion with a short vertical dimension of occlusion and has good aesthetic appearance.

DETAILED DESCRIPTION OF THE INVENTION

Technical Problems

The present invention has been devised to overcome the problems of the above technology, and the main object of the present invention is to provide an abutment capable of complement the problem described above that a coupling force between an upper coupling portion of the abutment with a lowered height and an artificial tooth reduce, by forming an adjustment groove on the upper coupling portion.

Another object of the present invention is to preserve the coupling force between the upper coupling portion and the artificial tooth, by forming an inclination on an inner side and an outer side of the adjustment groove and inducing the external force exerted on the artificial tooth to have directivity toward a direction of the fixture.

Another object of the present invention is to preserve the coupling force between the upper coupling portion and the artificial tooth more efficiently, precisely, by adjusting an angle of inclination of the adjustment groove or an imaginary surface.

SUMMARY OF THE INVENTION

In order to achieve the above object, the implant abutment capable of stably adjusting vertical dimension of occlusion according to the present invention includes: an upper coupling portion that is an upper portion coupled to an artificial tooth; a lower coupling portion that is a lower portion coupled to a fixture; an exposed portion that is a portion exposed to the outside between the upper coupling portion and the lower coupling portion, and an adjustment groove that is formed on an outer circumferential surface of the upper coupling portion and recessed in the upper coupling portion.

In addition, the adjustment groove may be formed in a radial shape at a predetermined interval on the outer circumferential surface of the upper coupling portion or may have a height from an upper surface to a lower surface of the upper coupling portion.

In addition, the adjustment groove includes: two side surfaces; a bottom surface connecting lower ends of the two side surfaces; a base surface that is in contact with inner sides of the two side surfaces and positioned opposite to an entrance portion of the adjustment groove, and an imaginary surface positioned at the entrance portion of the adjustment groove, wherein among four edges of the side surface, a top edge thereof may be formed to be shorter than a bottom edge thereof, and thus, the base surface extends to be inclined toward the imaginary surface as it goes from the upper surface of the upper coupling portion to the lower surface thereof.

Additionally, the imaginary surface may extend to be inclined outward as it goes from the upper surface of the upper coupling portion to the lower surface thereof.

TECHNICAL EFFECTS OF THE INVENTION

The implant abutment capable of stably adjusting vertical dimension of occlusion according to the present invention provides the following effects.

1) Although the abutment has a low upper coupling portion, it can maintain stable coupling with the artificial tooth, thereby ultimately ensuring ease of adjusting a height of the abutment.

2) By forming an inclination to a specific surface of the adjustment groove, movement of the artificial teeth can be guided in a direction of the fixture, thereby preventing the problem of artificial teeth from being separated outward.

3) By drilling a shape of the adjustment groove or forming a volume change of the upper and lower portion thereof, a vector of the force exerted from the artificial tooth can be guided in a specific direction.

BEST MODE FOR THE INVENTION

Hereinafter, preferred embodiments of the present invention will be described in detail with reference to the accompanying drawings. The accompanying drawings are not drawn to scale, and like reference numbers in each drawing denote like elements.

Figure 1:
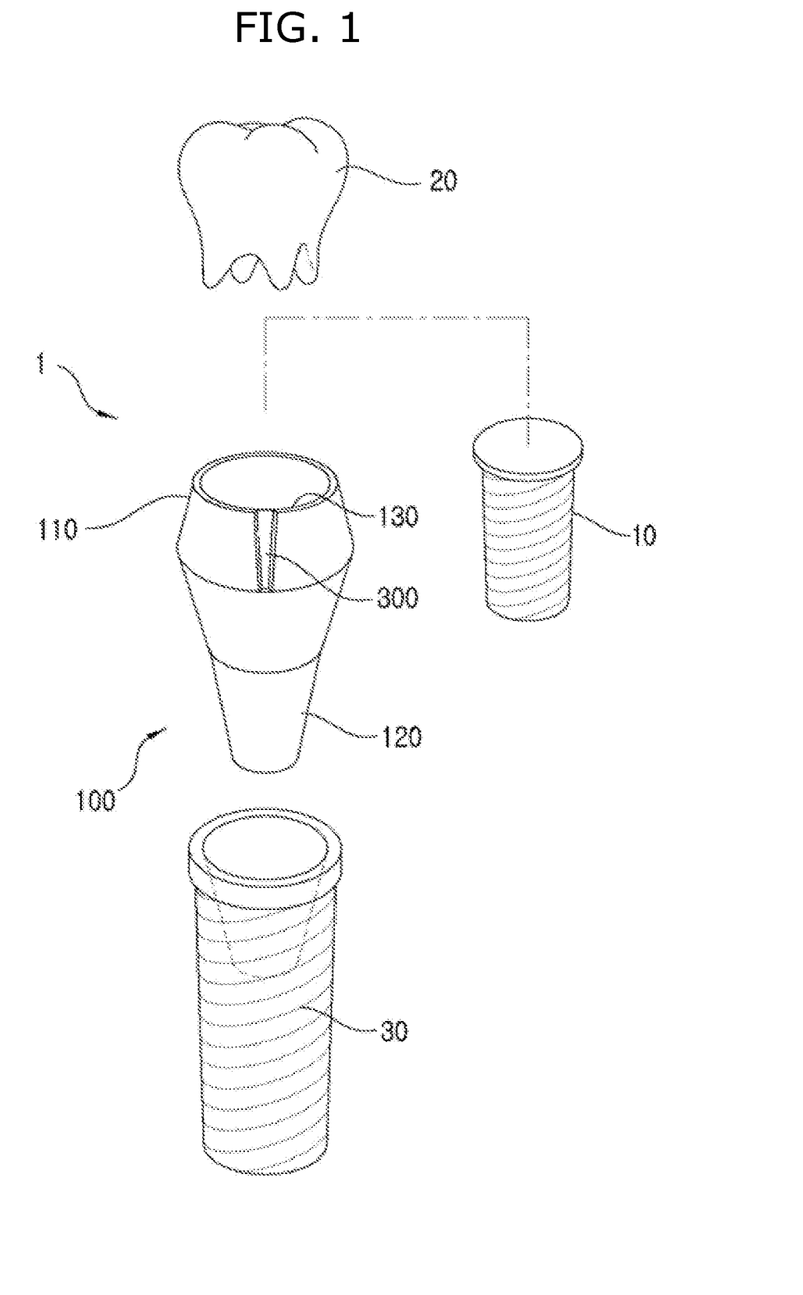
FIG. 1 is an exploded perspective view illustrating an implant in a state in which an adjustment groove is formed on an abutment according to the present invention.

FIG. 1 is an exploded perspective view illustrating an implant in a state in which an adjustment groove is formed on an abutment according to the present invention.

An implant 1 provides a function of replacing a tooth lost due to tooth cavity or gum disease by inserting an artificial tooth 20 into the gum. The implant 1 comprises an artificial tooth 20, an abutment 100 connected to the artificial tooth 20, and a fixture 30 inserted into a gum bone. A description for a known configuration of an implant will be omitted, and the abutment 100 related to the present invention will be briefly described as follows.

A general abutment has a cylindrical shape as a whole and comprises an upper coupling portion 110, a lower coupling portion 120, and an exposed portion 200 in a state in which an inside thereof is formed with a hollow 130. The abutment 100 of the present invention is also the same.

First, the upper coupling portion 110 is a portion that forms an upper portion of the abutment 100 and is inserted and coupled to the inside of the artificial tooth 20. A lower portion of the upper coupling portion 110 is formed larger than an upper portion of the upper coupling portion 110. That is, it is desired that the upper coupling portion 110 is provided as a structure capable of stably supporting a weight of the artificial tooth 20 by having a cylindrical shape with a hollow 130 therein and a trapezoidal shape in a cross section. At this time, the hollow 130 is formed through the lower coupling portion 120 and the exposed portion 200 to be described later as well as the upper coupling portion 110.

At this time, the abutment 100 may be categorized into a one-piece shape and a two-piece shape. In the case of the one-piece shape, since a hollow is not provided, the hollow 130 may not be an essential component. That is, the two-piece shape has been described as an example.

The lower coupling portion 120 is a portion forming a lower portion of the abutment 100 and is a portion coupled to the fixture 30 inserted into the gum bone. The lower coupling portion 120 is formed in a shape corresponding to a hexagonal head formed on an upper end of the fixture 30 and can be mounted on the fixture 30. In addition, the hexagonal head of the fixture 30 and a hexagonal groove of the abutment 100 have holes with a size corresponding to a diameter of a screw 10, which is described later, so that the screw 10 can be inserted through the holes. The hexagonal head and the hexagonal groove are only an example, and they may be formed in various other shapes.

The exposed portion 200 is the remaining portion of the abutment 100 excluding the upper coupling portion 110 and the lower coupling portion 120 and refers to a portion that is not covered by the upper and lower coupling portions 110, 120 and exposed to the outside. The exposed portion 200 is formed in a tapered shape so that a diameter gradually decreases from an upper portion of the exposed portion 200 to a lower portion of the exposed portion 200. Accordingly, the exposed portion 200 allows the upper coupling portion 110 to be naturally connected to the lower coupling portion 120, which is formed with a relatively smaller diameter than those of the upper coupling portion 110 and the lower portion of the upper coupling portion 110. This structure allows the exposed portion 200 to sufficiently supports a load of the artificial tooth 20 and ensures structural stability.

A general method of implant surgery can be explained as follows. First, the fixture 30 is inserted into the gum bone, and then, positions of the abutment 100 and the fixture 30 are adjusted so that the hexagonal groove of the lower coupling portion 120 of the abutment 100 and the hexagonal head of the fixture 30 are engaged with and stably coupled to each other. Next, by penetrating the screw 10 into a hollow 130 of the abutment 100 and tightening a head of the screw 10 to be coupled with the hexagonal groove of the lower coupling portion 120, the abutment 100 and the fixture 30 do not rotate and are tightly coupled to each other. Lastly, by coupling the artificial tooth 20 to the upper coupling portion 110 of the abutment 100, the operation of the implant 1 may be generally completed.

As mentioned above, when the known abutment is inserted into an area with a short vertical dimension of occlusion, the length of the upper coupling portion 110 is shortened, and thus, the coupling force between the abutment and the artificial tooth 20 may be weakened. Therefore, in order to improve this problem, the present invention provides a structure of a specialized upper coupling portion 110 capable of stably securing the coupling force between the artificial tooth 20 and the upper coupling portion 110 even in a portion of the abutment 100 with a short vertical dimension of occlusion.

Figure 2:
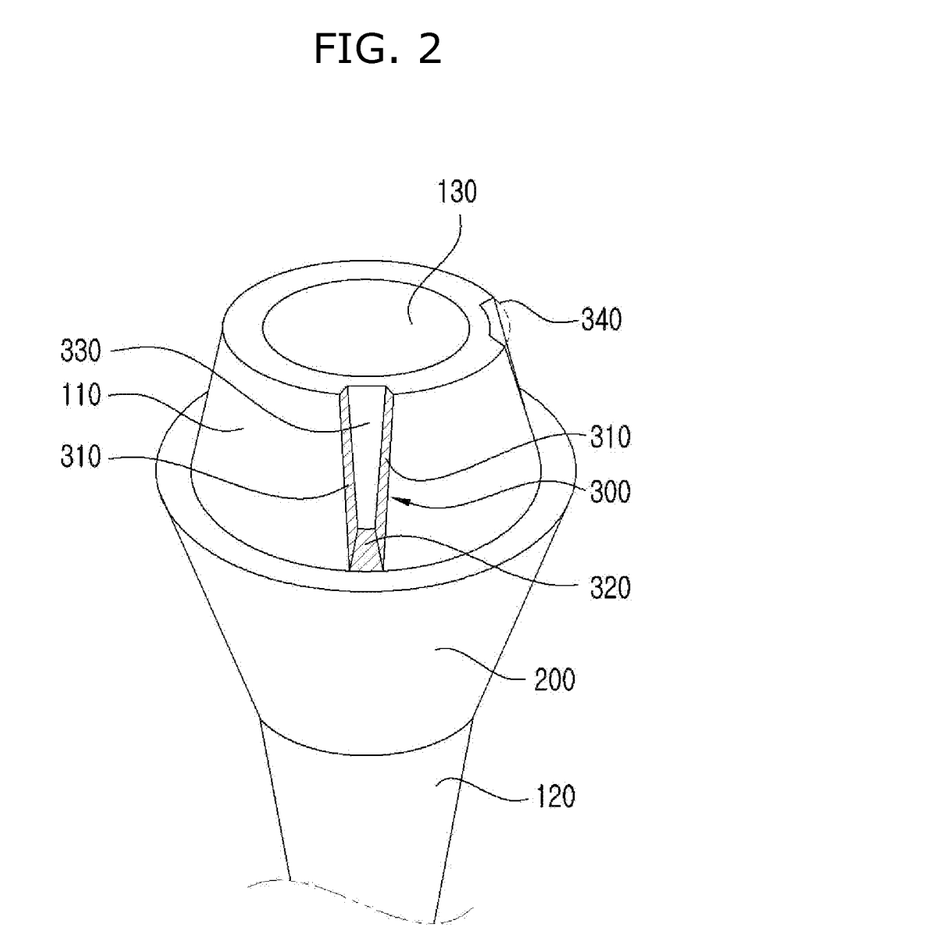
FIG. 2 is a partially magnified perspective view illustrating the abutment on which the adjustment groove is formed.
Figure 3A:
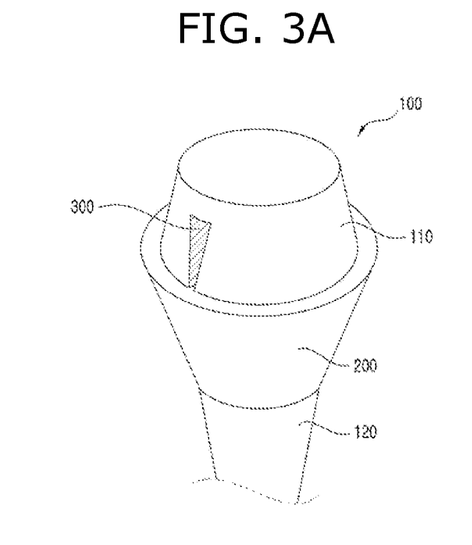
FIGS. 3A-3C are conceptual drawings illustrating various shapes of the adjustment groove according to the present invention.
Figure 3B:
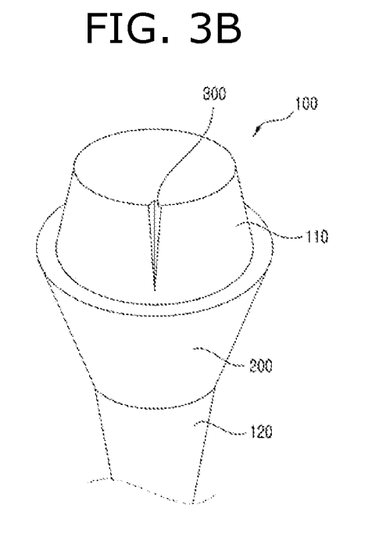
Figure 3C:
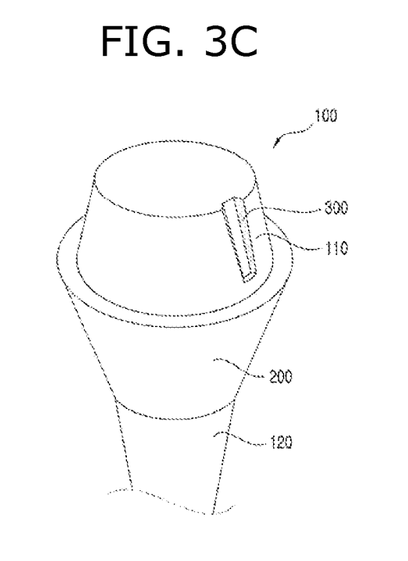
Figure 4:
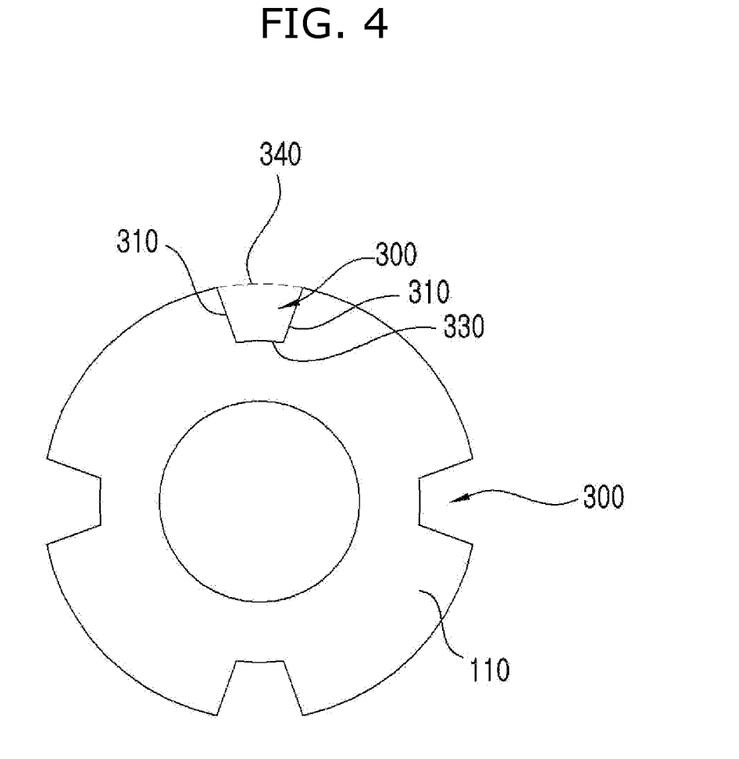
FIG. 4 is a top view illustrating the implant in FIG. 1.

FIG. 2 is a partially magnified perspective view illustrating the abutment on which the adjustment groove is formed. FIGS. 3A-3C are conceptual drawings illustrating various shapes of the adjustment groove according to the present invention. FIG. 4 is a top view illustrating the implant in FIG. 1.

Specifically, referring to FIGS. 1 to 4, at least one pair of adjustment grooves 300 are formed in the upper coupling portion 110 at positions facing each other or at a predetermined interval for balance.

The adjustment groove 300 of the present invention means a groove formed to be recessed inwardly from an outer circumferential surface of the upper coupling portion 110.

A function of the adjustment groove 300 will be explained based on a direction and principle of the force exerted to a coupling between the upper coupling portion 110 and the artificial tooth 20 surrounding an outer circumferential surface of the upper coupling portion 110 and coupled to the abutment 100.

Various external forces that can move the artificial teeth 20 may be applied to the artificial teeth 20, and these external forces may be applied in various directions in daily life of a patient. These external forces mainly promote the artificial teeth 20 to be separated from the abutment 100. Among these external forces, a moment of inertia and a centrifugal force that can have the greatest effect on the artificial tooth 20 will be mainly described.

From a viewpoint of movement of the artificial tooth 20, when the artificial tooth 20 is shaken, the moment of inertia exerted on the artificial tooth 20, specifically, a contact portion with an outer circumferential surface of the upper coupling portion 110, has a property that persists the movement of the artificial tooth 20. In particular, among the movement of the artificial tooth 20, the moment of inertia exerted on the artificial tooth 20 may serve to rotate along the outer circumferential surface of the upper coupling portion 110. Here, the moment of inertia is expressed as the equation: $I=mr^2$. I denotes moment of inertia, m denotes mass, and r denotes radius. Accordingly, the moment of inertia is proportional to a radius, that is, a diameter of the upper coupling portion, when a mass, that is, a weight of the artificial tooth 20 or the upper coupling portion 110 does not change.

In addition, when the artificial tooth 20 is rotated by the above-described moment of inertia among the moving forces along the outer circumferential surface of the upper coupling portion 110, a centrifugal force is exerted on the artificial tooth 20. This centrifugal force is also proportional to the diameter of the upper coupling portion 110 when the mass and an angular velocity are fixed. In other words, from viewpoints of the moment of inertia and centrifugal force, the more the artificial tooth 20 is away from a center of the upper coupling portion 110, the greater a force to be separated from the upper coupling portion 110 is exerted on the artificial tooth 20. Accordingly, the smaller the diameter of the upper coupling portion 110, the less the separation force. However, when the diameter of the upper coupling portion 110 is reduced too much, the required support force and structural stability of the abutment 100 are impaired.

The adjustment groove 300 of the present invention is formed to embody both maintaining the required support force of the abutment 100 and weakening of the separating force of the artificial tooth 20 as described above.

That is, the adjustment groove 300 performs a function of reducing the diameter of the circumferential portion of the upper coupling portion 110 to weaken the inertia of moment of the artificial tooth 20 to depart. In addition, from the viewpoint that the artificial tooth 20 rotates the circumference of the upper coupling portion 110, the adjustment groove 300 performs a function of reducing a rotation radius of the artificial tooth 20 to reduce the centrifugal force.

In addition, the recess depth and the number of the adjustment groove 300 may be increased as the height of the upper coupling portion 110 is lowered. The positions and spacings of the adjustment grooves 300 are not particularly limited, but as an example, two or more numbers of the adjustment grooves 300 may be disposed at an equal angle with respect to the center of the upper coupling portion 110 for structural stability.

In other words, the adjustment grooves 300 may be formed to be distributed in a radial shape at predetermined intervals on the outer circumferential surface of the upper coupling portion 110. Although not necessarily equally spaced, a plurality of adjustment grooves 300 may be designed to be distributed at irregular intervals in consideration of the directionality of the external force.

Alternatively, the adjustment groove 300 may have a height that is extended from the upper surface of the upper coupling portion 110, which faces the artificial tooth 20, to the lower surface thereof, which faces the fixture 30 or a shorter height than this.

Here, if the adjustment groove 300 has a height corresponding to the height of the upper coupling portion 110, some of the upper and lower surfaces of the upper coupling portion 110 are also opened. Generally, since the exposed portion 200 having a diameter larger than that of the upper coupling portion 110 is connected to the lower surface of the upper coupling portion 110, the lower surface of the upper coupling portion 110 is blocked by the exposed portion 200, unlike the upper surface of the upper coupling portion 110 being open.

Furthermore, a portion of the upper surface of the upper coupling portion 110 may be recessed toward the inner side, the center, of the upper coupling portion 110 to be opened, in order that the adjustment groove 300 more properly receive the external force applied to the upper surface of the upper coupling portion 110.

The adjustment groove 300 is particularly useful for a structure in which the vertical dimension of occlusion of the implant 1 is low, that is, a structure in which the coupling force with the artificial tooth 20 is likely to be weakened due to the low height of the abutment 100. In other words, since the number of adjustment grooves 300 can be changed according to the low degree of vertical dimension of occlusion, the adjustment grooves 300 enables the size of the vertical dimension of occlusion to be stably adjusted, mainly in case of lowering the vertical dimension of the occlusion.

The adjustment groove 300 may be recessed in a curvature shape such as a hemisphere or an ellipsoid but may be recessed in a rectangular parallelepiped shape or a similar structure to a rectangular parallelepiped shape. Referring again to FIGS. 2 to 3 again, the adjustment groove includes: two side surfaces 310; a bottom surface 320 connecting lower ends of the two side surfaces 310; a base surface 330 that is in contact with inner sides of the two side surfaces 310 and positioned opposite to an entrance portion of the adjustment groove 300.

That is, as compared to a general rectangular parallelepiped, an upper surface and one side surface of the adjustment groove 300 are in an open state with, and thus, it has four surfaces as a result. Here, although not a real surface, an open portion formed at one of the boundaries of the upper coupling portion 110 at the entrance portion of the adjustment groove 300 is referred to as an imaginary surface 340 in the present invention. When the imaginary surface 340 is included, the adjustment groove 300 may be described as being composed of a total of five surfaces.

In addition, in the description to be described later, the terms "upper portion" or "upper side", or "lower portion" or "lower side" are described based on the front view of the implant 1 mounted on mandible. The accompanying drawings are based on the implant 1 mounted on the mandible, and if the implant 1 is mounted on maxilla, it is possible to understand the description with the opposite direction. In other words, in the present invention, it should be understood that the upper surface of the upper coupling portion 110 means a surface of the upper coupling portion, which faces the artificial teeth 20, and the lower surface of the upper coupling portion 110 means a surface of the upper coupling portion, which faces the fixture 30.

If the adjustment groove 300 has a shape similar to a hexahedron shape rather than a hemispherical shape, the adjustment groove 300 weakens the moment of inertia of the artificial tooth 20 to escape and provides a role of absorbing and dispersing the external force more efficiently through physical volume formed by the side surface 310 and the base surface 330 and the space generated thereby.

Additionally, the side surface 310 of the adjustment groove 300 has four edges: a top, a bottom, a left, and a right edge based on the implant 1 mounted on the mandible and may be formed in a way that the top edge is shorter than the bottom edge. In this case, the base surface 330 has a structure that is extended to be inclined toward the imaginary surface as it goes from the upper surface of the upper coupling portion 110, the surface facing the artificial tooth 20, to the lower surface of the upper coupling portion 110, the surface facing the fixture 30.

If the base surface 330 has an inclined structure, a distance from the center of the upper coupling portion 110 to the base surface 330 is different from the upper surface and the lower surface of the upper coupling portion 110. That is, the diameter of the upper coupling portion 110 is different from the upper surface and the lower surface of the upper coupling portion 110. In other words, an upper diameter of the upper coupling portion 110 is relatively shortest and a lower diameter of the upper coupling portion 110 is the longest.

In this case, based on the above-described principle that a coupling force varies by a difference in diameter, the movement of the artificial tooth 20 may be most blunted at the upper side or portion of the upper coupling portion 110 and relatively active at the lower side or portion of the upper coupling portion 110. As such, when the degree of movement of the artificial tooth 20 is concentrated on or inclined downward according to a coupling area with the upper coupling portion 110, the movement of the artificial tooth 20 has naturally a downward directionality. Accordingly, the artificial tooth 20 has a directionality to conform to a direction of the fixture 30, thereby preventing the artificial tooth 20 from escaping upward. As a result, it is possible to efficiently provide a function of reducing the problem that the artificial tooth 20 is separated from the upper coupling portion 110.

Figure 5:
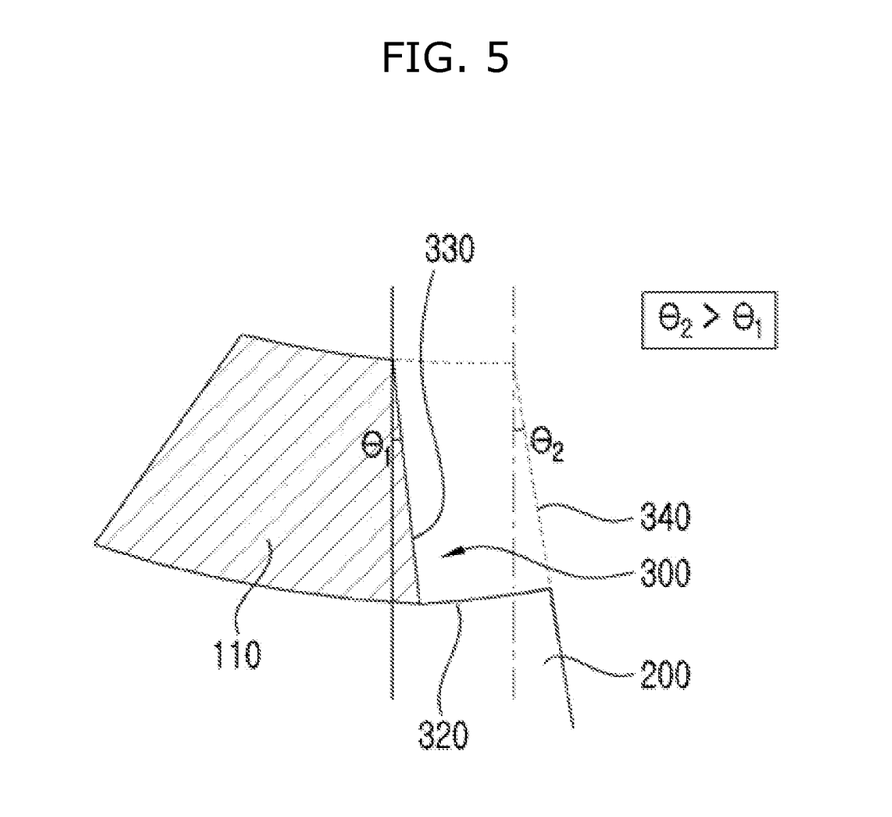
FIG. 5 is a vertical cross-sectional view illustrating a state in which a base surface and an imaginary surface of the adjustment groove are inclined.

FIG. 5 is a vertical cross-sectional view illustrating a state in which a base surface and an imaginary surface of the adjustment groove are inclined.

Referring to FIG. 5, the imaginary surface 340 of the adjustment groove 300 may extend to be inclined outward as it goes from the upper surface of the upper coupling portion 110, which faces the artificial tooth 20, to the lower surface of the upper coupling portion 110, which faces the fixture 30, like the base surface 330 described above.

This structure provides a role for enhancing the differentiation of the coupling force according to a diameter difference. That is, the differentiation of the coupling force according to a diameter difference exists in an outer portion, an imaginary surface side, of the adjustment groove 300 as well as an inner portion, a base surface side.

In other words, based on the mandibular implant, since the imaginary surface 340, which is a portion directly in contact with the artificial tooth 20 rather than the base surface 330, has a downward inclination, it can slow down the movement of the upper portion of the artificial tooth 20. That is, when the movement of the artificial tooth 20 occurs, the downward inclination of the imaginary surface 340 effectively prevent the artificial tooth 20 from deviating into the upward direction, which is a normal force direction, by making the artificial tooth 20 have downward directivity, which is a direction of the fixture. Of course, in the case of the maxillary implant, which is opposite to the mandibular implant, the same function as described above can be provided by the base surface 330 or the imaginary surface 340 having an upward inclination.

In this way, both the base surface 330 and the imaginary surface 340 may extend to be inclined toward the fixture 30 from the artificial tooth 20. Furthermore, each of the base surface 330 and the imaginary surface 340 may have an inclination angle based on an imaginary vertical line. At this time, the imaginary vertical line may be a line extending vertically from a top edge of the base surface 330, an artificial tooth side edge, or a line extending vertically from a top edge of the imaginary surface 340, an artificial tooth side edge. In the present invention, both may be referred to as 'imaginary vertical lines'.

Specifically, the base surface 330 extends obliquely with an inclination angle of 2 to 7° with respect to the imaginary vertical line, and the imaginary surface 340 extends obliquely with an inclination angle of 7 to 12° with respect to the imaginary vertical line. In this case, it is more preferable an inclination angle of the imaginary surface 340 is larger than that of the base surface 330.

As such, the inclination angles of the base surface 330 and the imaginary surface 340 may be varied according to a height dimension of the upper coupling portion 110 and a height dimension inserted into the artificial tooth 20. The inclination angle of each of the base surface 330 and the imaginary surface 340 described above was obtained empirically as a result of experiments with trial and error. The experiments have been performed when a Neigh dimension of the upper coupling portion 110 that is inserted into the artificial tooth 20 is 1.5 to 3.9 mm, and a height dimension of the upper coupling portion 110 is 2 to 6 mm.

In particular, since the inclination angle of the imaginary surface 340, which is a portion in direct contact with the artificial tooth 20, is formed to be greater than the inclination angle of the base surface 330, the movement of the artificial tooth 20 can be weakened and the coupling state between the artificial tooth 20 and the upper coupling portion 110 can be more stably maintained.

Additionally, the inclination angle of the base surface 330 and the number of adjustment grooves 300 on the base surface 330 may be differentially selected according to the height dimension of the upper coupling portion 110 that is inserted into the artificial tooth 20.

In other words, since the lower the height dimension of the upper coupling portion 110 inserted into the artificial tooth 20, the lower the coupling force with the artificial tooth 20, the inclination angle of the base surface 330 may be increased by adding a compensation angle of 2 to 5° for example, or the number of adjustment grooves 300 may be further increased by adding approximately 2 to 3. In this case, if the number of the adjustment grooves 300 increases in addition to the inclined structure described above, it can be understood that the number of the adjustment grooves 300 can increase a minute area of the upper coupling portion 110 in which the diameter thereof becomes smaller than that of the remaining area of the upper coupling portion 110.

Furthermore, the inclination angle of the base surface 330 may be corrected through Equation 1 below.

$$\theta = \theta_0\left(1 + \tanh\left(\frac{a}{d_2 - d_1}\right)\right). \quad \text{Equation 1}$$

Here, θ denotes a corrected inclination angle of the base surface)(°), $\theta_0$ denotes an initial inclination angle of the base surface)(°), a denotes an adjustment value, $d_1$ denotes a height dimension of a portion that is inserted into the artificial tooth in the upper coupling portion (mm), and $d_2$ denotes the total height dimension of the upper coupling portion (mm).

Equation 1 is for deriving a final corrected inclination angle of the base surface 330 according to a relationship between the overall height of the upper coupling portion 110 and the height of the portion inserted into the artificial tooth 20 in the upper coupling portion 110, by correcting an initial inclination angle of the base surface 330 by adding a compensated inclination angle. At this time, the initial inclination angle of the base surface 330 means an angle of 2 to 7° with respect to the imaginary vertical line as described above. Since this is an angle before correction, it may be initially set to 3 to 6° and the final inclination angle after correction may be set to have an angle of 2 to 7°.

The basic principle for Equation 1 can be explained as below. The $d_2$ has a larger value than $d_1$, and the smaller the difference between them, the weaker the coupling force of the artificial teeth 20. Therefore, in order to prevent the coupling force from being weakened, the base surface is set to have the increased inclination angle 330 and converges to a certain level of an angle so as not to weaken the coupling force by unnecessarily large inclination angle. That is, if the inclination angle and the reciprocal of the difference value between $d_2$ and $d_1$ are linearly proportional, the inclination angle becomes unnecessarily large, which can rather weaken the coupling force due to an inclination difference of the upper coupling portion 110 in a vertical direction. In this equation, a hypertangent tanh, which has a value less than 1 regardless of high or low values, is introduced to supplement and adjust the inclination angle and to be corrected to converge to a specific angle.

In this case, the adjustment value a may be set to a numerical value previously assigned to each section that is classified by the difference value between $d_2$ and $d_1$. In particular, for example, in the hypertangent tanh(x), when the value of x is 3 or more, it almost converges to 1, so it is preferable to adjust the adjustment value in the range of 0.5 to 2 so that the value of x is at the level of 0.5 to 2.

As an example for Equation 1, it is assumed that the initial inclination angle of the base surface 330 is 4°, the total height of the upper coupling portion 110 is 4 mm, the portion inserted into the artificial tooth 20 in the upper coupling portion 110 is 2 mm, and the adjustment value is 2. In this case, the corrected inclination angle of the base surface 330 according to Equation 1 is as follows.

$$4\left(1 + \tanh\left(\frac{2}{4-2}\right)\right) = 4.762$$

As another example for Equation 1, it is assumed that other variables are the same as above, and the portion inserted into the artificial tooth 20 in the upper coupling portion 110 is 3 mm. In this case, the corrected inclination angle of the base surface 330 according to Equation 1 is as follows.

$$4\left(1 + \tanh\left(\frac{2}{4-3}\right)\right) = 4.964$$

That is, even if the height difference between the upper coupling portion 110 and the portion inserted into the artificial tooth 20 in the upper coupling portion 110 is small, the compensation value can be adjusted to converge to less than 1 without increasing the inclination angle to be proportional to the reciprocal of the difference value. Accordingly, it is possible to effectively prevent the problem that the coupling force between the upper coupling portion 110 and the artificial tooth 20 is rather inhibited due to a high inclination angle of the base surface 330.

Figure 6:
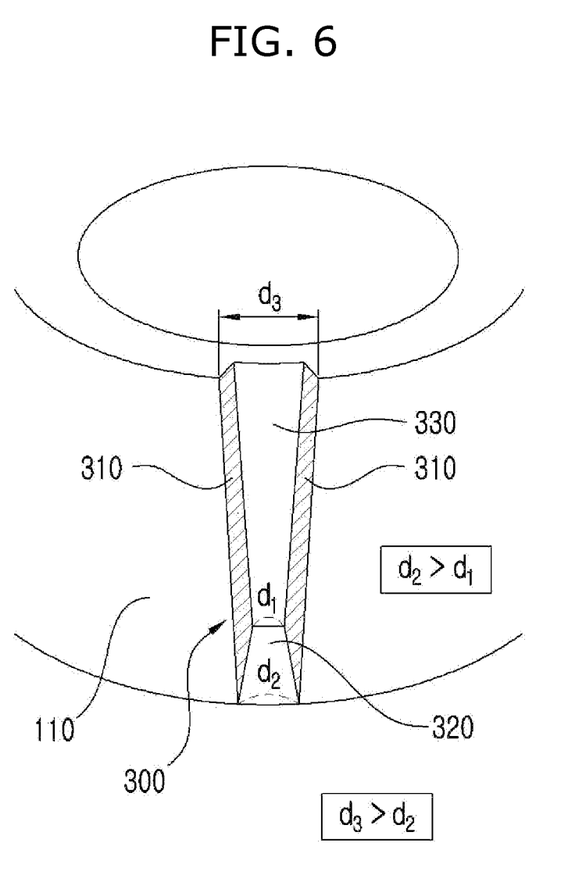
FIG. 6 is a conceptual drawing illustrating a modified embodiment in which the adjustment groove has directivity toward a fixture.

FIG. 6 is a conceptual drawing illustrating a modified embodiment in which the adjustment groove has directivity toward a fixture.

Referring to FIG. 6, among edges of the bottom surface 320, an inner edge in contact with the base surface 330 may be shorter than an outer edge in contact with the imaginary surface 340. This structure may be more useful when the base surface 330 and the imaginary surface 340 have an inclination angle as described above, especially when the base surface 330 of the adjustment groove 300 has an inclination angle of 2 to 7° and the imaginary surface 340 has an inclination angle of 7 to 12°, which is greater than that of the base surface 330.

According to this structure, the side surface 310 extends to be naturally inclined toward the base surface 330 as it goes from the upper surface of the upper coupling portion 110, the surface facing the artificial tooth 20, to the lower surface of the upper coupling portion 110, the surface facing the fixture 301, based on the implant 1 mounted on the mandible. Accordingly, the side surfaces 310 of the adjustment groove 300 are formed to be mutually apart from the inside to the outside. That is, the lower portion of the adjustment groove 300, which is in a fixture side, has a shape expanded from the inside to the outside. [86] According to the shape of the adjustment groove 300, the vector of force according to movement of the artificial tooth 20, which consist of magnitude and direction of the force, may naturally move to the lower portion of the adjustment groove 30, a fixture side by outwardly expanding the lower portion of the adjustment groove 300 in a state that the base surface 330 and the imaginary surface 340 have inclination. As a result, by guiding the external force of the artificial tooth 20 described above toward the direction of the fixture 30, it is possible to reasonably reduce lifting or movement of the artificial tooth 20 in an opposite direction to the fixture 30.

[87] Furthermore, the base surface 330 and the imaginary surface 340 have a tapered shape in which widths thereof are narrowed as they go from the upper surface of the upper coupling portion 110 to the lower surface of the upper coupling portion 110 based on the implant mounted on the mandible, and the bottom surface 320 may have an upwardly inclined shape as it goes from an inner edge in contact with the base surface 330 to an outer edge in contact with the imaginary surface 340. That is, the bottom surface 320 is inclined so that the height of the imaginary surface 340 decreases. As describe above, this structure may also be more useful when the base surface 330 and the imaginary surface 340 have an inclination angle as described above, especially when the base surface 330 of the adjustment groove 300 has an inclination angle of 2 to 7° and the imaginary surface 340 has an inclination angle of 7 to 12°, which is greater than that of the base surface 330.

In other words, in the implant 1 mounted on the mandible, when the base surface 330 and the imaginary surface 340 are viewed from the front, since the upper portion thereof is wide and the lower portion is narrow, the external force can be naturally guided downward of the adjustment groove 300. In addition, since the bottom surface 320 also has a shape with an upward inclination from the inside to the outside, and induces the external force introduced through the lower portion of the adjustment groove 300 to the inside of the lower portion of the adjustment groove 300, the external force can be more reliably guided toward the direction of the fixture 30. Therefore, it is possible to prevent the problem of the artificial tooth 20 from moving or lifting toward in a direction to escape from the abutment 100.

Accordingly, the structure described above can efficiently distribute the external force by naturally guiding the external force or the movement of the artificial tooth 20 in the direction of the fixture 30 and can prevent the artificial tooth from being deviated to the outside due to the fixture directivity of the external force.

As described above, although the configuration and mechanism of the implant abutment capable of stably adjusting the vertical dimension of occlusion according to the present invention has been expressed with examples in the above description and accompanying drawings, the spirit of the present invention is not limited to the above description and drawings. Accordingly, various changes and modifications are possible without departing from the technical spirit of the present invention.

What is claimed is:

1. An implant abutment capable of stably adjusting vertical dimension of occlusion, the implant abutment comprising:
   an upper coupling portion that is an upper portion coupled to an artificial tooth;
   a lower coupling portion that is a lower portion coupled to a fixture;
   an exposed portion that is a portion exposed to the outside between the upper coupling portion and the lower coupling portion; and
   an adjustment groove that is formed on an outer circumferential surface of the upper coupling portion and inwardly recessed in the upper coupling portion,
   wherein the adjustment groove includes: two side flat surfaces; a bottom flat surface connecting lower ends of the two side flat surfaces; a base surface that is in contact with inner sides of the two side flat surfaces and positioned opposite to an entrance portion of the adjustment groove; and an imaginary surface positioned at the entrance portion of the adjustment groove,
   wherein among four edges of the side flat surface, a top edge thereof is formed to be shorter than a bottom edge thereof, and the base surface extends to be inclined toward the imaginary surface as the base surface goes in a direction from a surface of the upper coupling portion that faces the artificial tooth to a surface of the upper coupling portion that faces the fixture,
   wherein the imaginary surface extends to be outwardly inclined as the imaginary surface goes in a direction from a surface of the upper coupling portion that faces the artificial tooth to a surface of the upper coupling portion that faces the fixture,
   wherein an inclination angle of the imaginary surface is larger than an inclination angle of the base surface.

2. The implant abutment of claim 1, wherein a plurality of adjustment grooves are present and arranged in a radial shape at a predetermined interval on the outer circumferential surface of the upper coupling portion.

3. The implant abutment of claim 1, wherein the adjustment groove has a height extended from a surface of the upper coupling portion that faces the artificial tooth to a surface of the upper coupling portion that faces the fixture.

4. The implant abutment of claim 1, wherein the adjustment groove is formed with a portion of an upper surface of the upper coupling portion to be opened.

5. The implant abutment of claim 1, wherein the base surface obliquely extends with the inclination angle of 2 to 7° with respect to an imaginary vertical line extending vertically from an edge of the base surface positioned close to the artificial tooth, and the imaginary surface obliquely extends with the inclination angle of 7 to 12° with respect to an imaginary vertical line extending vertically from an edge of the base surface positioned close to the artificial tooth.

6. The implant abutment of claim 1, wherein the inclination angle of the base surface with respect to an imaginary vertical line extending vertically from an edge of the base surface positioned close to the artificial tooth and the number of adjustment grooves are differentially selected according to a height dimension of the upper coupling portion that is inserted into the artificial tooth.

7. An implant abutment capable of stably adjusting vertical dimension of occlusion, the implant abutment comprising:
- an upper coupling portion that is an upper portion coupled to an artificial tooth;
- a lower coupling portion that is a lower portion coupled to a fixture;
- an exposed portion that is a portion exposed to the outside between the upper coupling portion and the lower coupling portion; and
- an adjustment groove that is formed on an outer circumferential surface of the upper coupling portion and inwardly recessed in the upper coupling portion,
- wherein the adjustment groove includes: two side flat surfaces; a bottom flat surface connecting lower ends of the two side flat surfaces; a base surface that is in contact with inner sides of the two side flat surfaces and positioned opposite to an entrance portion of the adjustment groove; and an imaginary surface positioned at the entrance portion of the adjustment groove,
  - wherein the bottom flat surface is formed in such a way that an inner edge of the bottom flat surface in contact with the base surface is shorter than an outer edge of the bottom flat surface in contact with the imaginary surface, and thus, the side flat surface extends to be naturally inclined toward the base surface as the side flat surface goes in a direction from a surface of the upper coupling portion that faces the artificial tooth to a surface of the upper coupling portion that faces the fixture,
- wherein the base surface extends to be inclined toward the imaginary surface as the base surface goes in a direction from a surface of the upper coupling portion that faces the artificial tooth to a surface of the upper coupling portion that faces the fixture,
- wherein the imaginary surface extends to be outwardly inclined as the imaginary surface goes in a direction from a surface of the upper coupling portion that faces the artificial tooth to a surface of the upper coupling portion that faces the fixture,
- wherein an inclination angle of the imaginary surface is larger than an inclination angle of the base surface.

8. An implant abutment capable of stably adjusting vertical dimension of occlusion, the implant abutment comprising:
- an upper coupling portion that is an upper portion coupled to an artificial tooth;
- a lower coupling portion that is a lower portion coupled to a fixture;
- an exposed portion that is a portion exposed to the outside between the upper coupling portion and the lower coupling portion; and
- an adjustment groove that is formed on an outer circumferential surface of the upper coupling portion and inwardly recessed in the upper coupling portion,
- wherein the adjustment groove includes: two side flat surfaces; a bottom flat surface connecting lower ends of the two side flat surfaces; a base surface that is in contact with inner sides of the two side flat surfaces and positioned opposite to an entrance portion of the adjustment groove; and an imaginary surface positioned at the entrance portion of the adjustment groove,
- wherein each of the base surface and the imaginary surface has a tapered shape in which a width thereof is narrowed as each of the base surface and the imaginary surface goes in a direction from a surface of the upper coupling portion that faces the artificial tooth to a surface of the upper coupling portion that faces the fixture, and the bottom flat surface extends to be upwardly inclined as the bottom flat surface goes from an inner edge in contact with the base surface to an outer edge in contact with the imaginary surface so that a height of the imaginary surface decreases,
- wherein the base surface extends to be inclined toward the imaginary surface as the base surface goes in a direction from a surface of the upper coupling portion that faces the artificial tooth to a surface of the upper coupling portion that faces the fixture,
- wherein the imaginary surface extends to be outwardly inclined as the imaginary surface goes in a direction from a surface of the upper coupling portion that faces the artificial tooth to a surface of the upper coupling portion that faces the fixture,
- wherein an inclination angle of the imaginary surface is larger than an inclination angle of the base surface.

* * * * *